US006830284B2

United States Patent
Guillez et al.

(10) Patent No.: US 6,830,284 B2
(45) Date of Patent: Dec. 14, 2004

(54) FOLDING ROOF IN PARTICULAR FOR STATION WAGON, WITH PIVOTING AND SLIDING ELEMENTS

(75) Inventors: Jean-Marc Guillez, Cirieres (FR); Gérard Queveau, Le Pin (FR)

(73) Assignee: France Design, Le Pin (FR)

( * ) Notice: Subject to any disclaimer, the term of this patent is extended or adjusted under 35 U.S.C. 154(b) by 0 days.

(21) Appl. No.: 10/451,675

(22) PCT Filed: Dec. 5, 2001

(86) PCT No.: PCT/FR01/03845

§ 371 (c)(1),
(2), (4) Date: Jun. 20, 2003

(87) PCT Pub. No.: WO02/051659

PCT Pub. Date: Jul. 4, 2002

(65) Prior Publication Data

US 2004/0090082 A1 May 13, 2004

(30) Foreign Application Priority Data

Dec. 26, 2000 (FR) ............................. 00 17033

(51) Int. Cl.[7] ................................................ B60J 7/08
(52) U.S. Cl. ................... 296/108; 296/107.17
(58) Field of Search .................. 296/107.17, 108, 296/107.016, 116, 107.18

(56) References Cited

U.S. PATENT DOCUMENTS

| 2,705,225 A | * | 3/1955 | Kowolik et al. ............ 524/208 |
| 6,336,673 B1 | * | 1/2002 | Rothe et al. ........... 296/107.17 |
| 6,481,781 B2 | * | 11/2002 | Bergerhoff et al. ..... 296/107.17 |

* cited by examiner

Primary Examiner—Joseph D. Pape
(74) Attorney, Agent, or Firm—Nawrocki, Rooney & Sivertson, P.A.

(57) ABSTRACT

A retractable roof for a vehicle has three rigid roof sections. A plurality of links and levers connect to the three roof sections and control and guide the three roof sections in an optimal manner as they move from a closure position covering a compartment of the vehicle to a storage position in a rear boot of the vehicle. The roof section and boot dimensions allow the roof sections to fit into the boot.

6 Claims, 1 Drawing Sheet

FOLDING ROOF IN PARTICULAR FOR STATION WAGON, WITH PIVOTING AND SLIDING ELEMENTS

CROSS-REFERENCE TO RELATED APPLICATIONS

None

STATEMENT REGARDING FEDERALLY SPONSORED RESEARCH OR DEVELOPMENT

None

INCORPORATED-BY-REFERENCE OF MATERIAL SUBMITTED ON A COMPACT DISC

None

BACKGROUND OF THE INVENTION

Field of the Invention

The present invention concerns a retractable roof or one which can be folded into the rear boot of a vehicle.

Such a retractable roof makes it possible in particular to convert a vehicle of the two-seater coupé or four-seater coupé or saloon type into a vehicle of the cabriolet type.

In the case of four-seater coupés or saloons, the roof is relatively long, so that the retractable roof consists of three elements, each of which has a length compatible with the dimensions of the boot of the vehicle.

Description of Related Art including information disclosure under 37 CFR 1.97 and 1.98:

A vehicle retractable roof is thus known, comprising a front roof element, an intermediate roof element and a rear roof element, these three elements being mobile between a position in which they cover the passenger compartment of the vehicle and a position in which they are superposed substantially horizontally in the rear boot of the vehicle.

BRIEF SUMMARY OF THE INVENTION

The invention relates more particularly to a retractable roof, in particular for a vehicle such as a station wagon, comprising a front rigid roof element, an intermediate rigid roof element, and a rear rigid roof element, the last of these being situated close to the rear upper edge of the rear boot of the vehicle.

The aim of the present invention is to provide improvements to the known means, in order to control and guide in an optimal manner the movement of the roof elements between their closure position and their storage position in the boot.

According to the invention, the retractable roof is characterised in that the rear element is linked in an articulated manner close to the upper rear edge of the rear boot so as to be able to tilt towards the front inside the rear boot, in that the intermediate element is linked in an articulated manner, on the one hand to a pivoting arm articulated to the body, at a point situated close to the front upper edge of the boot, and on the other hand to a lever articulated to this intermediate element and to the rear element, in that the intermediate element is linked to the front element by an articulated lever, the rear end of the front element carrying a finger capable of fitting in a groove extending along the intermediate element, first linking means being provided for controlling the pivoting of the lever in order to push the front element along the groove and make it pass above the intermediate element, during the pivoting of said pivoting arm towards the rear, and second linking means being provided for controlling the tilting of the rear element towards the front and towards the boot, during the pivoting of said pivoting arm towards the rear.

Preferably, said first linking means comprise a link rod linking in an articulated manner said pivoting arm to the lever linking the intermediate element to the front element.

Also preferably, said second means comprise a connecting rod linking in an articulated manner a continuation of the pivoting arm situated beyond its point of articulation to the body and the rear part of the rear element at a point spaced away from the articulation thereof to the body.

Other specific features and advantages of the invention will emerge further in the description below.

In the accompanying drawings, given by way of non-limitative examples:

BRIEF DESCRIPTION OF THE SEVERAL VIEWS OF THE DRAWING(S)

DETAILED DESCRIPTION OF THE INVENTION

Figure 1:
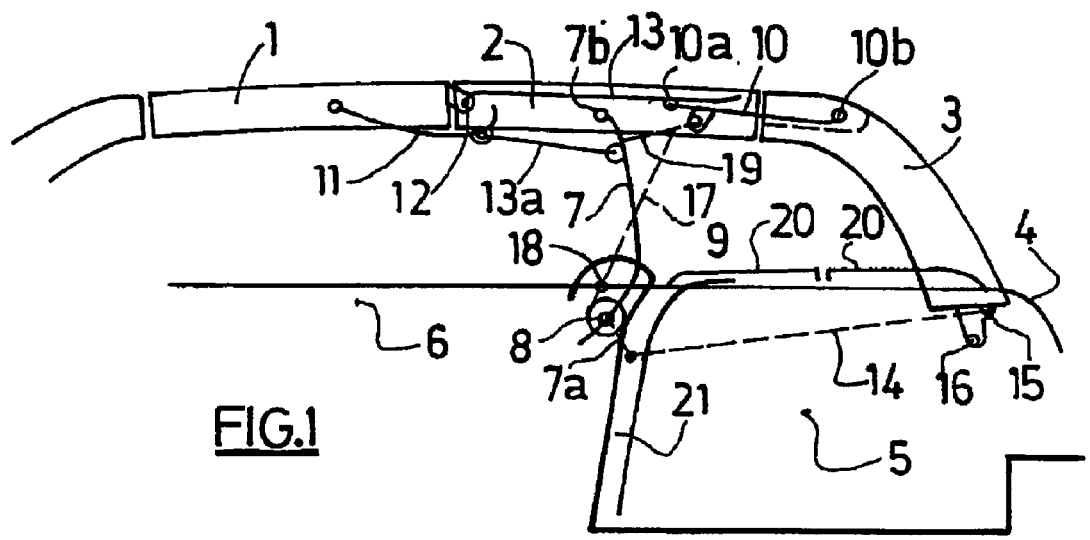
FIG. 1 is a schematic view in partial longitudinal section of a vehicle equipped with a retractable roof according to the invention, in the closed position.
Figure 2:
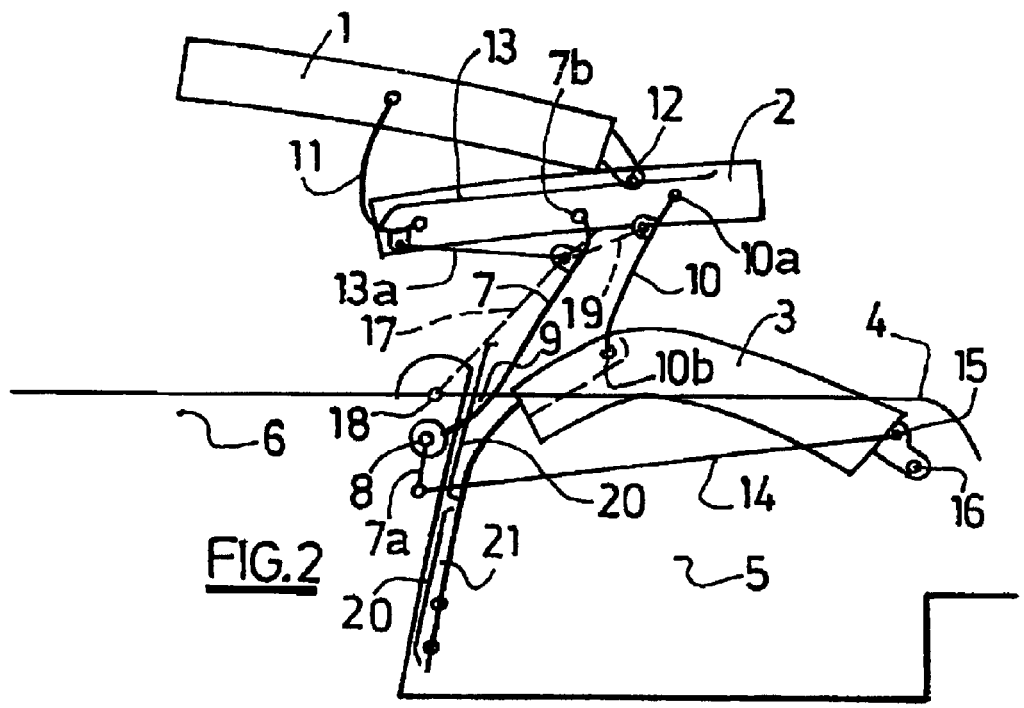
FIG. 2 is a view similar to FIG. 1, the retractable roof being in an intermediate position.
Figure 3:
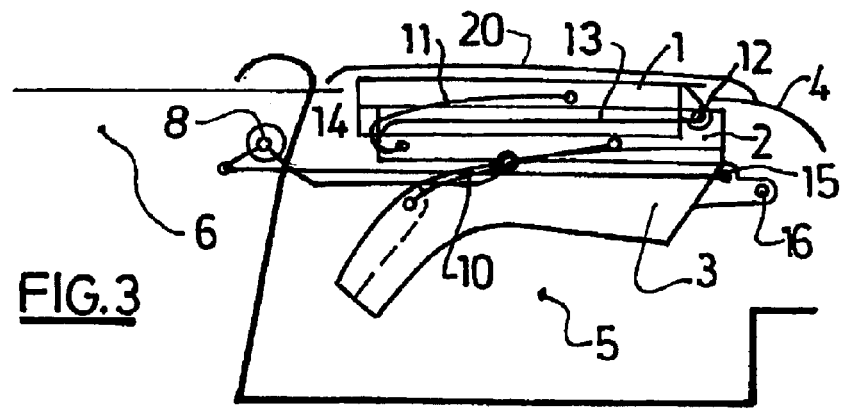
FIG. 3 is a view similar to FIGS. 1 and 2, the retractable roof being in a position stored in the boot of the vehicle.

In the embodiment depicted in FIGS. 1 to 3, the vehicle retractable roof comprises a front roof element 1, an intermediate roof element 2 and a rear roof element 3. These three elements 1, 2, 3 are mobile between a position in which (see FIG. 1) they cover the passenger compartment 6 of the vehicle and a position in which (see FIG. 3) they are superposed substantially horizontally in the rear boot 5 of the vehicle.

The vehicle depicted being of the station wagon type, the rear rigid roof element (3) is situated close to the rear upper edge (4) of the rear boot (5) of the vehicle.

In accordance with the invention, the rear element (3) is linked in an articulated manner at 16 close to the upper rear edge (4) of the rear boot (5) so as to be able to tilt towards the front inside the rear boot (5). The intermediate element (2) is linked in an articulated manner at 7b on the one hand, to a pivoting arm (7) articulated to the body at a point (8) situated close to the front upper edge (9) of the boot (5), and on the other hand to a lever (10) articulated at 10a to this intermediate element (2) and at 10b to the rear element (3).

The intermediate element (2) is linked to the front element (1) by an articulated lever (11), the rear end of the front element (1) carrying a finger (12) capable of fitting in a groove (13) extending along the intermediate element (2). First linking means are provided for controlling the pivoting of the lever (11) in order to push the front element (1) along the groove (13) in order to make it pass above the intermediate element (2), during the pivoting of said pivoting arm (7) towards the rear. Furthermore, second linking means are provided for controlling the tilting of the rear element (3) towards the front and towards the boot (5), during the pivoting of said pivoting arm (7) towards the rear.

In the example depicted, the first linking means comprise a link rod (13a) linking in an articulated manner said pivoting arm (7) to the lever (11), linking the intermediate element (2) to the front element (1).

In the example depicted, said second means comprise a connecting rod (14) linking in an articulated manner a continuation (7a) of the pivoting arm (7) situated beyond its point of articulation (8) to the body and the rear part of the rear element (3) at a point (15) spaced away from the articulation (16) thereof to the body.

By way of a variant, the first linking means comprise a lever (17) articulated to the lever (10) linking the rear element (3) and the intermediate element (2) and articulated to a fixed point (18) of the frame.

In another variant, the linking means comprise a link rod (19) articulated to the arm (7) and to one (10) of the levers linking the rear (3) and intermediate (2) elements.

It can also be seen in FIGS. 1 to 3 that the upper face of the rear boot (5) adjacent to the inside of the passenger compartment (6) of the vehicle comprises one of more panels (20) movable between a position (see FIG. 1) in which they close off said face and a position (see FIG. 2) in which they unblock said face in order to allow the passage of the roof elements (1, 2, 3) and are stored in a space (21) adjacent to the front wall (5a) of the boot (5).

The retractable roof which has just been described works in the manner indicated below.

When the roof is in the closed position, the elements (1), (2), (3) are locked to one another and to fixed parts of the body.

The upper face of the boot is closed off by panels (20).

To open the roof, a start is made by unlocking the elements (1), (2) and (3) and moving the panels (20) into the space (21) situated inside the boot (5).

The movement of the panels (20) towards the boot can be controlled automatically using a device which is not depicted.

Next, the pivoting of the arm (7) towards the rear is controlled by a hydraulic actuator or an electric motor.

The motion of the arm (7) controls the movement towards the rear of the intermediate element (2) and the tilting towards the front and towards the boot of the rear element (3) by means of the lever (10) and the lever (14).

The tilting of the arm (7) towards the rear controls, by means of the link rod (13a), the pivoting upwards of the lever (11) and the sliding of the front element (1) along the groove (13) which makes the front element (1) pass above the intermediate element (2).

At the limit of travel, the elements (3), (2), (1) are stored in the rear boot in a superposed and substantially horizontal manner.

The panels (20) can then be put back in place in order to close off the upper part of the rear boot which is adjacent to the passenger compartment (6).

What is claimed is:

1. A retractable roof, for a vehicle, comprising a front rigid roof element (1), an intermediate rigid roof element (2), and a rear rigid roof element (3), the last of these being situated close to a rear upper edge (4) of a rear boot (5) of the vehicle, the roof elements (1, 2, 3) being movable between a position in which they cover the passenger compartment (6) of the vehicle and a position in which they are stored in the rear boot (5), characterised a) in that the rear element (3) is linked in an articulated manner close to the upper rear edge (4) of the rear boot (5) so as to be able to tilt towards the front inside the rear boot (5), b) in that the intermediate element (2) is linked in an articulated manner, to a pivoting arm (7) articulated to the body, at a point (8) situated close to the front upper edge (9) of the boot (5), and to a lever (10) articulated to the intermediate element (2) and to the rear element (3), and c) in that the intermediate element (2) is linked to the front element (1) by an articulated lever (11), the rear end of the front element (1) carrying a finger (12) capable of fitting in a groove (13) extending along the intermediate element (2), first linking means being provided for controlling the pivoting of the lever (11) in order to push the front element (1) along the groove (13) and make it pass above the intermediate element (2), during the pivoting of said pivoting arm (7) towards the rear, and second linking means being provided for controlling the tilting of the rear element (3) towards the front and towards the boot (5), during the pivoting of said pivoting arm (7) towards the rear.

2. A retractable roof according to claim 1, characterised in that said first linking means comprise a link rod (13a) linking in an articulated manner said pivoting arm (7) to the lever (11) linking the intermediate element (2) to the front element (1).

3. A retractable roof according to either of claim 1 or 2, characterised in that said second linking means comprise a connecting rod (14) linking in an articulated manner a continuation (7a) of the pivoting arm (7) situated beyond its point of articulation (8) to the body and the rear part of the rear element (3) at a point (15) spaced away from the articulation (16) thereof to the body.

4. A retractable roof according to claim 1, characterised in that said first linking means comprise a lever (17) articulated to the lever (10) linking the rear element (3) and the intermediate element (2) and articulated to a fixed point (18) of the frame.

5. A retractable roof according to claim 1, characterised in that said first linking means comprise a link rod (19) articulated to the arm (7) and to the lever (10) linking the rear (3) and intermediate (2) elements.

6. A retractable roof according to one of claims 1 to 5, characterised in that an upper face of the rear boot (5) adjacent to the inside of the passenger compartment (6) of the vehicle comprises one of more panels (20) movable between a position in which they close off said face and a position in which they unblock said face in order to allow the passage of the roof elements (1, 2, 3) and are stored in a space (21) adjacent to the front wall of the boot (5).

* * * * *